June 24, 1969 R. B. FAST ET AL 3,451,822
PROCESS FOR MAKING A PUFFABLE CHIP-TYPE SNACK FOOD PRODUCT
Filed Sept. 9, 1965
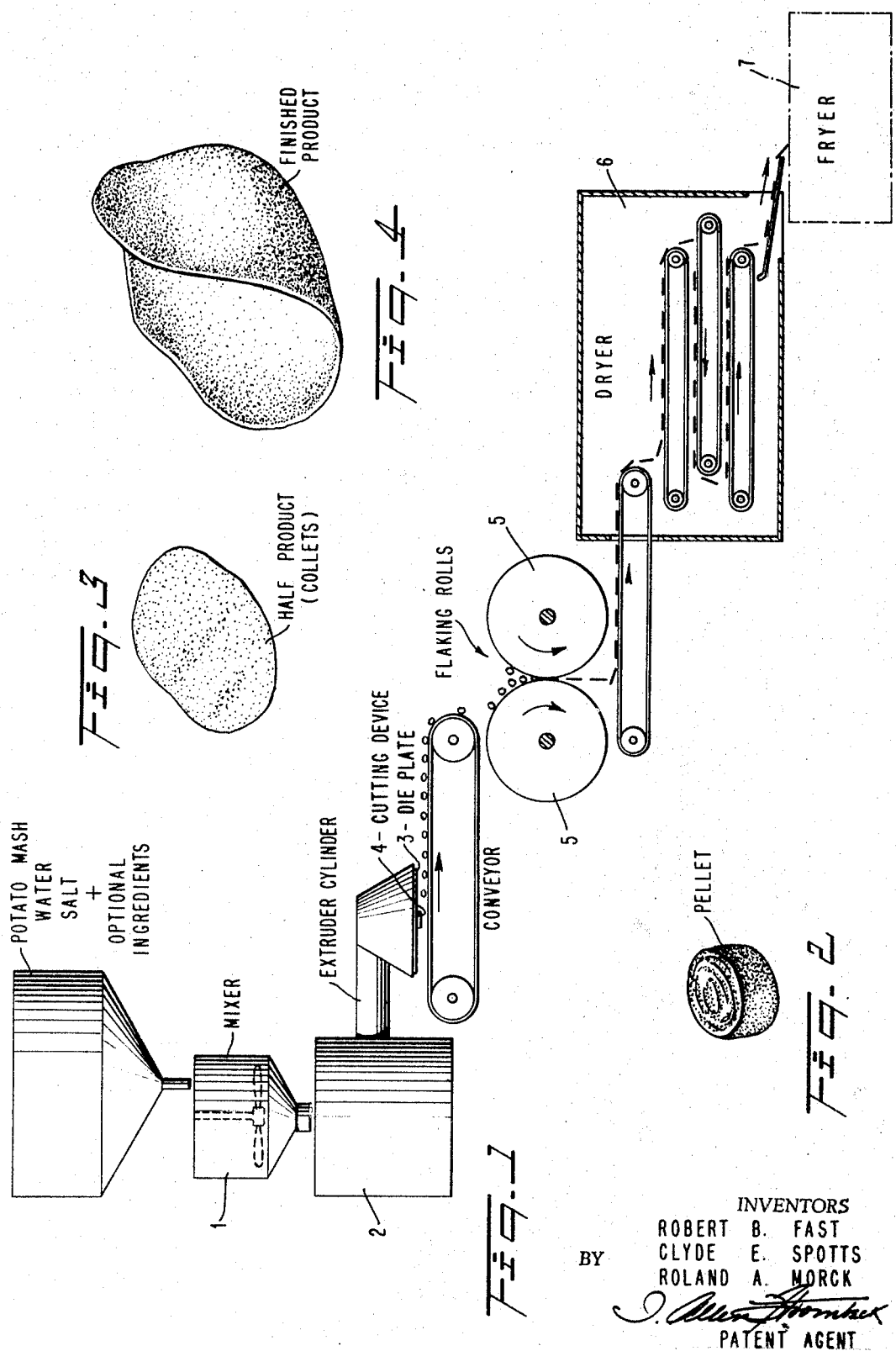
INVENTORS
ROBERT B. FAST
CLYDE E. SPOTTS
ROLAND A. MORCK
BY
PATENT AGENT

United States Patent Office 3,451,822
Patented June 24, 1969

3,451,822
PROCESS FOR MAKING A PUFFABLE CHIP-TYPE SNACK FOOD PRODUCT
Robert B. Fast, Glen Rock, Clyde E. Spotts, Fair Lawn, and Roland A. Morck, Glen Rock, N.J., assignors to National Biscuit Company, a corporation of New Jersey
Filed Sept. 9, 1965, Ser. No. 486,128
Int. Cl. A23l 1/12
U.S. Cl. 99—100    10 Claims

ABSTRACT OF THE DISCLOSURE

A crispy chip-type snack food in the form of a half-product otherwise known as a potato collet made from precooked starchy vegetable matter such as potato puree extruded at high pressure through a die plate. The extrudate is cut to form segments which are flattened between large rotating flaking rolls and then conveyed to a drier preparatory to storage and subsequent deep fat frying.

---

This invention relates to edible snack products made from tubers and, in general, from vegetable products, such as potatoes which are high in starch content.

More specifically the invention relates to half-products, that is, products which may be stored at room temperature in the unfinished form and which expand on further cooking. The invention also relates to a process for making the puffable materials of the invention.

Many processes are known in the art for the production of snack items, from vegetable products, and in particular from starch-containing materials. In the case of potatoes, these processes may be divided into two categories, namely, processes which use cooked potatoes as a starting material, and processes which utilize the raw material.

One of the main disadvantages encountered in the utilization of raw potatoes for the preparation of potato products, for instance chips and snacks, is the lack of uniformity of the finished food items. This problem is mainly associated with the composition of the raw potatoes. Many factors, such as location, season of the year, length of storage, and type of potatoes, influence the composition, that is, solid content, sugar content, and particularly the reducing sugar content of the raw potatoes. The latter differs in the different layers of the potatoes and is substantially higher in the portion about one inch underneath the outer surface. Since the rate of browning during frying, is directly affected by the reducing sugar content, potato products prepared from raw potatoes, show substantial variations in quality, color and flavor, within the same unit.

Another reason for the lack of uniformity of the finished products, is that the extent of oil absorption, on frying, differs, depending upon the solid content of the potatoes, and increases with the decrease of the solid content. Since the solid content is substantially affected by length of storage time and storage conditions, it is manifest that the finished fried goods may show substantial variations in the amount of oil absorbed.

In order to obviate the problems encountered with the use of raw potatoes, many suggestions have been made. For instance, U.S.P. 2,286,644 describes an apparatus and a process for slicing raw potatoes, steeping them in water, and dropping them into the cooking liquid, on a conveyor belt of such shape that the slices do not curl, nor warp. Finally the potato products are subjected to the action of ultraviolet light, to destroy bacteria and other organisms. Although the process of this patent constitutes some improvement over the prior art, it is manifest that the main advantage resides in the use of an apparatus, during frying, which maintains the slices in one position, prevents distortion, and gives a more homogeneous product.

Recently U.S.P. 3,109,739 describes a process for cutting raw potatoes into small particles, of size in the range of 0.02 inch in diameter, removing by centrifugation a substantial amount of the liquid which is formed, adding a gelling agent, extruding to give chips and frying. Although this process offers some advantages over the prior art, in providing a homogeneous product, the loss of nutrients, minerals and natural flavoring agents, in the aqueous layer, which is removed by centrifugation, and the number of steps involved, are serious drawbacks.

More recently, U.S.P. 3,150,978 describes a process for the preparation of puffable half-products from uncooked dough, in which, the operations of kneading, cooking and shaping, are combined in one step. It is there claimed that gelatinization and compression of the starchy raw material are achieved through an extrusion apparatus, and that the product is suitable for storage and capable of expanding on frying. The material after being cooked, is cooled, in the same extrusion apparatus, before being released at atmospheric pressure, in order to prevent expansion of the food items at this stage. Manifestly, the apparatus required for this process is quite complex since it must provide for cooking the raw material, kneading the dough, and cooling the head of the extruder. One drawback of this process is that the band issuing from the extruder must be cut in very thin discs, of thickness in the range of 0.03 inch, in order to obtain a half-product which will puff properly on frying. Another drawback is that, the material, being cooled within the kneading extruder and then cut, offers resistance to the cutting device, and the product is obtained in slices with uneven and rough surfaces.

In the case of cooked potatoes, many more processes are known in the art for the production of crisps and snacks. The process of U.S.P. 2,665,208 consists of stewing potatoes, working them into a homogeneous mass, with starch, the latter being in an amount essentially twice the amount of the potatoes. The mass is then pressed, brought to about 11% water content, cut into a band and fried. Manifestly, the finished goods are closer to a synthetic reconstituted food item rather than a natural potato product, because of the great amount of starch added. Another disadvantage is the limited application of the process, because it is successful only with potatoes which have been freshly harvested.

The process of U.S.P. 2,863,770 utilize a preswelled and dried potato powder, and comprises adding water without cooking, pressing the material into a band, drying, cutting and frying. The apparatus required must operate at a pressure of at least 6 atmospheres, and gives a band of only 1 mm. thickness. The finished goods have flat, poor flavor, similar to reconstituted synthetic food products.

It is manifest from the above summary, that, in spite of the efforts made towards the achievement of a satisfactory process for the preparation of puffable half-products from potatoes, either raw or cooked, the known processes still present serious disadvantages, namely lack of homogeneity, lack of flavor, laborious procedures and expensive equipment.

One object of this invention is to prepare a product which, after frying or baking, offers the advantages, mainly the homogeneity of the products prepared from cooked potatoes, and which retains the natural nutrients, flavoring agents and minerals of the products prepared from raw potatoes, and which is far superior in flavor to the varieties of reconstituted or synthetic comestibles.

Another object of this invention is to provide a half-product capable of being converted into an appetizing, nutritious and crisp snack item by a short frying or baking time.

Still another object is to prepare a half-product stable to storage, completely homogeneous, and which may be prepared from potatoes of widely divergent compositions, fresh potatoes as well as potatoes which have been stored under a variety of conditions of temperature and moisture.

A further object is to prepare a half-product capable of puffing readily on frying or baking, by simple, inexpensive steps and easily available apparatus.

Another object is to prepare a product which may be easily sliced to give a homogeneous surface, with a homogeneous clean cut by simple inexpensive equipment.

The crux of this invention resides in the finding that the above stated advantages may be achieved by cooking potatoes, adjusting the water content to a predetermined value, in the range of 20 to 40%, subjecting the material to a kneading operation, to achieve uniform hydration at a temperature in the range of 225° F. to 270° F., to rupture the starch cells, with a residence time of 1.5 to 3 minutes in the kneading zone, so that a homogeneous and coherent dough is obtained. The dough is then extruded at essentially the same temperature, immediately cut into small essentially round pellets, of thickness between 0.25 and 0.3 inch. The next step comprises compression of the individual portions which causes a substantial increase in width, between twice or three times the diameter of the original pellets, and a substantial decrease of thickness to between 0.020 and 0.065 inch. The material is then dried to moisture content between 6 and 12%. The resulting portions are ready for further cooking, in a non-aqueous medium, for instance by frying or baking, or may be stored, practically indefinitely.

According to the preferred embodiment of the invention, the moisture content is adjusted to between 25 and 35%, the temperature within the kneading zone is 230° F. to 250° F., and the moisture content of the extrudate is 20%. Although not part of this invention, the final cooking step is preferably conducted by frying at a temperature of 375° to 400° F., in an oil or shortening, for a very short time, 10 to 15 seconds.

It may readily be seen from the above summary that this invention resides in the combination of simple known steps, which, in the proper sequence and under the conditions as described hereinbelow, produce the superior half-product capable of being converted into a finished food item, of superior qualities and palatability.

One feature of this invention resides in the extrusion of the dough from the kneading chamber without cooling, that is, essentially at the temperature of the dough during the kneading operation, between 225° F. and 270° F., and immediately slicing the dough by means of a cutting device located in the proximity of the head of the extrusion apparatus. The advantages resulting from conducting the extrusion and cutting steps without cooling, may be appreciated if one compares the process of this invention with the processes known in the art. When the dough is extruded, cooled and then subjected to an independent cutting operation, the knives or blades of the cutting device have a tendency to become covered with parts of the adhering sticky dough. Further, the process is more expensive from a commercial standpoint, since the cutting step constitutes a separate operation requiring additional equipment, time and labor. Even where the dough is cooled within the kneading chamber and then extruded, and cut, for instance, at a temperature of 160° to 200° F., the blades of the cutting machine become covered with parts of the dough, because the dough is sticky and a clean homogeneous cut cannot be achieved. Another disadvantage is that where the dough is cut and shaped in one single operation, it is necessary to subdivide the dough into very thin portions, for instance of thickness in the range of 0.03 inch, because portions of greater thickness are not properly fried and the final product would not be of attractive texture, taste and appearance. On the other hand, when the extrusion and cutting steps are conducted in accordance with this instant invention, at the same temperature as the dough is kneaded, the dough which is soft but not sticky, can be readily and simply cut to give piecelets with a clean homogeneous surface and cutting is conducted more economically, with simple equipment. Further, since cutting and shaping according to the process of this instant invention are conducted in two distinct operations, the thickness of the individual portions in the cutting step is not critical because shaping is achieved in the next step. In accordance with the process of this instant invention, the individual portions may be easily obtained with a thickness between 0.25 and 0.3 inch, that is substantially greater than in the processes known in the art.

As already mentioned above, another feature of this instant invention is the compression of the individual piecelets, identified in this art as "collets," immediately after extrusion and cutting. The individual portions of dough, by compression, as it will be explained more thoroughly below, are converted into portions essentially two to three times the width of the portions as they emerge from the extrusion chamber, of oval shape, with thickness decreased from between 0.25 and 0.33 inch to between 0.020 and 0.065 inch. Several advantages result from the compression. The compressed product may be dried and stored before frying, and exhibits improved shelf life. On frying, it absorbs less oil than other conventional fried potato products and is more platatable. The finished fried food items have a uniform golden color, are crisp, and may be stored for a period of two to three months, without loss in flavor. They have a porous, honeycomb structure, and yet are firmer, less brittle than the known varieties of commercial potato snacks. The flavor is substantially improved, because they absorb less oil than conventional products.

The invention will now be explained more completely by reference to the accompanying flow sheet, FIGURE 1. In actual practice, potatoes of different variety, size and composition, may be used as starting material. They are peeled, for instance by a combination of dilute caustic solution and high pressure steam. After thorough washing with water, they are trimmed, cooked in boiling water for about one-half hour and mashed. The resulting puree may be used directly in accordance with the process of this invention, or may be stored, if necessary. For this purpose, the material is dehydrated until the moisture content is 6 to 10%.

In FIGURE 1, 1 is a suitable mixing unit where the potatoes are mixed with sufficient water to bring the total moisture content to between 20 and 40%, and with salt in amount of 4 to 5% of the total composition. The material is then transferred to the kneading unit, 2, where it is kneaded under conditions of temperature and pressure sufficient to disrupt the starch cells. The equipment employed is a conventional type extruder, which comprises a chamber, a jacket for supplying heat externally, and an internally-rotating screw, which acts as a conveyor. A screw of 23 inches overall length and a chamber of overall length 18 inches and width 3 inches is satisfactory, although other commercially available extruders may be used, provided at least 80% rupture of the starch cells is achieved with a residence time between 1.5 and 3 minutes.

The temperature within the extruder is maintained at 225° to 270° F., by supplying steam through the jacket. It is also possible to supply heat to the extruder, by other means, for instance high-boiling heat transfer liquid, or electricity. In the latter case, no external jacket is required. At this temperature, a pressure of at least 5 atmospheres develops within the extrusion chamber. Good dough development, complete hydration and substantial rupture of the starch cells occurs under these conditions, with a residence time of 1.5 to 3 minutes. A shorter period is unsatisfactory because the resulting dough is not sufficiently coherent and is non-homogeneous due to poor hydration.

The extruder is provided with a die plate 3, which permits the dough to issue in any desired shape, depending on the shape of the orifice, which may be, for instance, rectangular, oval, round, or square. The extrudate is cut transversely by a rotating knife, or other suitable cutting device 4, located in the proximity of the orifice. As mentioned above, the material is cut into pellets of thickness between 0.25 and 0.3 inch. Some expansion occurs as the dough issues from the head of the extruder, under pressure, essentially at the temperature of 225° to 270° F., to atmospheric pressure. The density of the individual portions or pellets at this stage is about 1.2 to 1.4 gram per cubic centimeter.

The moisture content of the individual portions, as they emerge from the extruder is 15 to 25%. After leaving the cutting device, the individual portions, which have a round shape if the orifice of the extruder is round, fall through a chute (not shown) into compression device 5. The apparatus used is preferably a pair of flaking rolls where the pellets are compressed to form collets, oval-shaped bodies of width two to three times the diameter of the original pellets, with thickness between 0.020 and 0.065 inch.

The food portions are then dried in unit 6, to a moisture content between 6 and 12%. Hot air, at a temperature of about 160° to 200° F., for a period of 30 to 60 minutes, is preferably used for this purpose. The density of the dried portions is essentially 1.1 to 1.3 gram per cubic centimeter.

FIGURE 2 shows one of the portions or pellets as it emerges from the cutter, essentially round. FIGURE 3 shows one of the collets, in accordance with this instant invention, after compression, essentially oval, slightly curled and with a very homogeneous surface. Comparison of FIGURE 2 with FIGURE 3 shows that the half-product after compression is considerably larger than the original pellet.

The individual portions are then cooked by frying in a deep fat fryer at 375°–400° F., in any of the conventional oils or shortenings for about 10 to 15 seconds. They puff considerably during frying, essentially to twice the size, both in width and thickness. The density of the fried foods is 0.2 to 0.4 gram per cubic centimeter.

FIGURE 4 shows one of the piecelets prepared according to this instant invention, after frying. Comparison of FIGURE 3 with FIGURE 4 demonstrates the degree of expansion of the individual piecelets upon frying. It is also manifest from FIGURE 3 and FIGURE 4 that both the half-product and the finished fried product, have uniform, even texture and appearance.

According to one embodiment of the invention, the potatoes in the proportion of 70–75%, still containing 7% water, and added water, in the proportion of 24–27%, with salt, in the proportion of 4 to 5% of the total composition, are mixed in mixer 1 until the material is uniform. The mass is transferred to the kneading extruder 2, where the dough temperature is kept at 250° F. After extrusion, cutting and flaking, as described above, the material is dried to a moisture content of 6 to 12%. Broadly, satisfactory results are obtained with a composition comprising up to 75% of mashed potatoes of moisture content 6 to 10%, 4 to 5% of salt and about 20% added water.

According to the preferred embodiment of the invention, the total amount of water, including the water present in the cooked mashed potatoes, is adjusted to 24–25%, and the proportion of potato puree, which contains 7% moisture, is decreased to 62%, with the amount of salt being kept at 4 to 5% of the total composition. The composition also comprises a gelling agent, preferably in the proportion of 9% of the total composition. The gelling agent may be potato starch, pregelatinized waxy maize starch, or one of the natural gums such as, for instance, algin, gum tragacanth, agar, and guar. The purpose of the gelling agent is to add elasticity and body to the dough, allow for better expansion during frying, increased crispness, and to render the finished food items, after frying, less brittle. A mixture of gelling agents is preferred, such as potato starch and pregelatinized waxy maize starch, in equal proportion, each 4 to 5% of the total composition.

The dried shaped half-product, with water content between 6 and 12%, may be stored, without any deterioration whatever, practically indefinitely at room temperature, if packaged in air-tight wrapping, for instance, cellophane bags, or in bulk quantities, in polyethylene-lined drums. The long shelf life is very advantageous because the product may be stored, shipped and then fried by the consumer at the location of consumption.

The examples given below are given by way of illustration of the present invention.

Example 1

The following ingredients were intimately mixed in the proportion set forth below.

| Ingredient | Total amount used, in pounds | Percent by weight |
| --- | --- | --- |
| Precooked and dehydrated potatoes, containing 7% water | 100 | 62.12 |
| Water added | 39 | 24.25 |
| Potato starch | 7.3 | 4.54 |
| Pregelatinized waxy maize starch | 7.3 | 4.54 |
| Salt | 7.3 | 4.54 |

If the water present in the cooked potatoes is included, the total water content in the above formulation, was 28.5%. The potato starch, pregelatinized waxy maize starch and potatoes, were mixed at low speed in a commercial mixer, to give an essentially dry blend. Then the salt was dissolved in water, the solution added to the dry blend and mixing continued until the material was homogeneous. The material was then fed into the same commercial extruder described above.

No external heat was supplied, in addition to the heat developed within the extrusion chamber, due to friction and heat of hydration. The pressure development within the apparatus, was small. As the screw conveyor was rotated, the material advanced towards the head, and after a residence time of 3 minutes, was extruded, through ten round orifices, of diameter 0.75 inch.

A revolving knife, located in the proximity of the head of the extruder, cut the material into slices of thickness essentially 0.25 inch. The cutting operation was difficult. The material emerging from the extruder, had a temperature of 80° to 100° F., was incompletely hydrated, and tough. The individual piecelets were of uneven and non-homogeneous surface, and the knife became rapidly covered with particles of the adhering dough.

The material, of moisture content 20%, was immediately compressed between two electrically-operated flaking rolls, and converted into oval-shaped bodies of about 1.25 to 1.50 inch in length and thickness 0.063 inch. The flaked material was dried at 160° F. for one hour until the moisture content was about 8%. It was fried in a deep fat fryer, containing a mixture of cotton-seed, peanut oil and corn oil, at 375° F. for about 10 seconds. The material expanded poorly, contained many hard particles, which scorched during frying, and the food item as a whole had a hard bite. The flavor, due to the presence of the scorched particles, was poor. The moisture content of the finished goods was 2%. The density of the finished goods was 0.8 gram per cubic centimeter.

Example 2

The ingredients in the same proportion as set forth in Example 1, were mixed as described above and the mixture fed into the same kneading extruder. Dowtherm was passed through the external jacket, to maintain the dough temperature at substantially 250° F. The residence time was 2.5 minutes. The dough emerging from the die, at a temperature of 250° F., was cut into round slices of thickness about 0.25 inch. The cutting operation was easy as compared with the material from Example 1, since the dough was soft, not sticky and of satisfactory consistency. The individual discs had a very even surface with no particles adhering to the knife. The material, of moisture content 20%, was compressed by passing through flaking rolls, to give essentially oval bodies of length between 1.25 and 2 inches, and of thickness 0.063 inch. It was then dried, as in Example 1 to moisture content 8%. The density was 1.2 grams per cubic centimeter. They were fried as described above.

The finished goods were far superior to the goods prepared as described in Example 1. They considerably puffed, on frying, both in width and thickness. The food items were of uniform golden color, very crisp, with a porous honeycomb structure, and yet not brittle, much firmer than conventional potato chips. The density was 0.3 gram per cubic centimeter.

Comparison of the results in Example 1 and 2, shows that, in spite of the fact that the residence time was shorter in Example 2 than in Example 1, far superior products are obtained when the dough is heated during the kneading operation, in several respects, ease of cutting, texture, consistency and flavor of the finished fried products.

The preparation was repeated with the same formulation as above. The material was processed through the extruder where the temperature was kept at 250° F., and after a residence time of 2.5 minutes, the extrudate was immediately collected as long ropes of diameter 0.75 inch. The ropes were then cooled to room temperature, cut into pellets of thickness 0.06 inch and dried to moisture content 8%. Thus the same process as above was repeated, omitting the compression step. After frying, as specified above, the food items did not puff, were hard, and practically inedible.

Comparison of the latter experiment with the former preparation in which the pellets were subjected to compression by the action of flaking rolls, indicates the advantage achieved by the compression step in the quality of the finished product. Thus it is possible, in accordance with the process of this instant invention, to achieve a very satisfactory product by a simple, inexpensive procedure. The kneading, extrusion and cutting steps are conducted in a simpler manner than other processes known in the art, because the thickness of the individual food portions is not crucial at the cutting stage. Shaping of the individual food portions, to give piecelets of thickness 0.063 inch, suitable for frying, is simply achieved by the compression step, after cutting.

Example 3

The following formulation was substituted for the ingredients used in Example 1:

| Ingredients | Total amount used, in pounds | Percent by weight |
| --- | --- | --- |
| Cooked mashed potatoes containing 7% water | 100 | 68.3 |
| Salt | 7.3 | 4.0 |
| Water | 39 | 26.7 |

The proportion of water in the total composition was higher, that is, 31%, because of the water present in the cooked mashed potatoes. The salt was dissolved in water and the solution added to the potatoes, mixed mechanically and the mixture fed into the kneading extruder, as in Example 2. The residence time was 3 minutes at a temperature of 250° F. The same operations, extruding, cutting, flaking and drying, were conducted as in Example 2. The finished goods were superior to the product of Example 1, but inferior to the food items of Example 2, indicating that the gelling agents contribute to good hydration, adequate body and consistency of the dough, and crispness and good texture of the fried material.

The proportion of the gelling agents within the scope of the invention, is preferably kept in the range of 9%, although a higher concentration, up to 27%, is permissible. In the latter case, the potato mash proportion is reduced to about 40%. The material, with the higher concentration of gelling agents, has a more bland flavor and is more desiarble, if the finished product is to be used, for instance, with cheese spreads and, in general, with food items very rich in flavor. A higher concentration of gelling agents, greater than 27%, makes the dough so sticky, that it cannot be conveniently extruded and cut.

Other ingredients may be added to improve the flavor, color and other properties of the final food product. Among such optional ingredients, there may be mentioned monosodium glutamate, seasonings and flavoring agents, such as, for instance, hydrolyzed vegetable proteins, and egg powder. It is also possible to add dehydrated meat, bacon, fish, ham, salami, to provide variety of flavors and nutritive items. The amount of the optional flavoring agents may be varied over a wide range, between 0.25 and 10% of the weight of precooked potatoes.

Although in the examples shown above, the half-product is fried, cooking by the ultimate consumer may also be achieved by baking, for a period of 5 minutes, at 450° F. The latter procedure, however, is less desirable, since it gives a lower degree of expansion and a less crisp product.

While a few specific embodiments of this invention have been described and set forth in detail, many changes and modifications may be made without materially departing from the spirit of the invention, which is to be limited only by the scope of the appended claims.

What is claimed is:

1. The process of producing a puffable chip-type snack food product from potatoes which are rich in starch content, which comprises the steps of:
   (1) Cooking said potatoes in water, mashing to obtain a homogeneous mass, adjusting the moisture content and adding salt thereto, whereby the water content of the total composition is between 20 and 40% and the salt content is between 4 and 5% by weight,
   (2) Mechanically agitating said moistened mass to obtain a blend,
   (3) Passing said blend at a temperature between 225° and 270° F. in a kneading zone between closely spaced surfaces whereby a pressure of at least 5 atmospheres is developed which disrupts the starch cells of said potatoes at least to the extent of 80% and a uniformly hydrated dough is obtained with a residence time between 1.5 and 3 minutes,
   (4) Exrtuding said dough at same temperature, immediately subdividing same extrudate into smaller bodies,
   (5) Compressing said bodies until the overall width is at least doubled and the thickness is substantially reduced,
   (6) And drying to a moisture content between 6 and 12%.

2. The process according to claim 1 wherein said blend in step 2 comprises water in the proportion of 20 to 25%, salt in the proportion of 4 to 5%, the remainder being said precooked potatoes.

3. The process according to claim 2 wherein said blend in step (2) additionally comprises a gelling agent in the proportion of 9 to 27%.

4. The process according to claim 3 wherein said gelling agent is a member selected from the group consisting of potato starch, pregelatinized waxy maize starch, algin, natural plant gums and mixtures thereof.

5. The process according to claim 3 wherein said gelling agent is a mixture of potato starch and pregelatinized waxy maize starch.

6. The process according to claim 4 wherein said blend comprises 62.14% of cooked potatoes containing 7% water, 4.5% salt, 4.5% potato starch, 4.5% pregelatinized waxy maize starch, and 24.2% added water.

7. The process according to claim 1 wherein said drying in step (6) is conducted at 160° to 200° F. for a period of 30 to 60 minutes.

8. The process according to claim 1 wherein said dough upon issuing from said kneading zone has a moisture content between 15 and 25%.

9. The process according to claim 1 wherein the water content in step (1) is adjusted to 30%.

10. The process of producing a fried crisp foodstuff of density essentially between 0.2 and 0.4 grams per cubic centimeter from potatoes, which comprises blending pre-cooked potatoes with water, salt and a gelling agent, in such an amount that the resulting mixture contains between 20 and 40% water, between 4 and 5% salt, between 9 and 27% gelling agent, kneading the blend thus formed in a kneading type extruder under pressure at 225° to 270° F. to rupture the starch cells of the potatoes to at least to the extent of 80% with a residence time of 1.5 to 3 minutes, to obtain a homogenous dough, extruding said dough to ambient pressure at said enclosed temperature and immediately subdividing into smaller units compressing said units until the thickness is between 0.020 and 0.065 inch, drying the latter to a moisture content between 6 and 12% and frying at 375° to 400° F. for 10 to 15 seconds.

References Cited

UNITED STATES PATENTS

| | | | |
|---|---|---|---|
| 3,027,258 | 3/1962 | Markakis et al. | 99—100 X |
| 3,150,978 | 9/1964 | Campfield | 99—81 |
| 3,220,852 | 11/1965 | Gerkens | 99—100 |

A. LOUIS MONACELL, *Primary Examiner.*

D. M. NAFF, *Assistant Examiner.*

U.S. Cl. X.R.

99—207